US006714288B2

(12) United States Patent
Cohen

(10) Patent No.: US 6,714,288 B2
(45) Date of Patent: Mar. 30, 2004

(54) COUNTERFEIT DETECTION APPARATUS

(76) Inventor: Roy Cohen, 64 Ryan Rd., Stoughton, MA (US) 02072

( * ) Notice: Subject to any disclaimer, the term of this patent is extended or adjusted under 35 U.S.C. 154(b) by 387 days.

(21) Appl. No.: 09/848,912

(22) Filed: May 4, 2001

(65) Prior Publication Data

US 2002/0163633 A1 Nov. 7, 2002

(51) Int. Cl.[7] ........................................ G06K 9/74
(52) U.S. Cl. ........................................ 356/71
(58) Field of Search ........................ 356/71; 250/504 H, 250/493.1

(56) References Cited

U.S. PATENT DOCUMENTS 2,059,197 A * 11/1936 Backer et al. .............. 359/801
2,161,594 A * 6/1939 Ruth ........................... 356/71
3,774,046 A * 11/1973 Hoch et al. .............. 250/485.1
4,381,892 A * 5/1983 Someya ...................... 396/534
5,072,128 A * 12/1991 Hayano et al. ........ 250/559.18
5,243,405 A * 9/1993 Tichenor et al. ............ 356/600
5,444,263 A * 8/1995 Mastnak ................. 250/504 H
5,874,742 A * 2/1999 Romano .................. 250/461.1
6,470,093 B2 * 10/2002 Liang ......................... 382/135

* cited by examiner

*Primary Examiner*—Russell Adams
*Assistant Examiner*—Andrew Sever
(74) *Attorney, Agent, or Firm*—Charles Bickoff

(57) ABSTRACT

A counterfeit detection device that is useful for optically examining the security features of currency to determine its authenticity. The apparatus places the currency at the object plane of a magnifying lens suitable for enlarging the image of the microprinting as well as examining other fine features of the bill. In one embodiment, the device consists of a rear illuminating light source a bill positioning slot a magnifying lens, and an environmental light shade. Further embodiments include a capability of front illumination to detect the color shifting ink, an ultraviolet light source causal to viewing the phosphorescent glow of the polyester thread with its identifying color. And finally, a version with a swing-away lens to view the watermark unmagnified.

17 Claims, 4 Drawing Sheets

COUNTERFEIT DETECTION APPARATUS

CROSS-REFERENCES TO RELATED APPLICATIONS

Not Applicable

STATEMENT REGARDING FEDERALLY SPONSORED RESEARCH OR DEVELOPMENT

Not applicable

MICROFICHE APPENDIX

Not Applicable

BACKGROUND OF THE INVENTION

1. Field of the Invention

The present invention relates to the detection of security features on monetary documents and the like. The US Federal Government has taken steps in recent years to combat counterfeiting of paper currency. Other monetary issuing agencies throughout the world have taken like steps. Additionally, banking organizations have added security features to other documents such as checks to impede forgery.

2. The Prior Art

The advent of inexpensive computer and color printing and copying systems has made counterfeiting a much easier task than heretofore possible. As such, the US Government and other monetary issuing agencies have added a number of very difficult to duplicate features to the paper currency. The list below is particular to the US $10 bill but is indicative of the remainder of commonly circulated United States currencies.

1. Federal Reserve Indicators—A new universal seal represents the entire Federal Reserve System. A letter and number beneath the left serial number identify the issuing Federal Reserve Bank.
2. Portrait—The enlarged portrait of the first Secretary of the Treasury, Alexander Hamilton is easier to recognize, while the added detail is harder to duplicate. The portrait is now off-center, providing room for a watermark and reducing wear and tear on the portrait.
3. Security Thread—A polymer thread embedded vertically in the paper to the right of the portrait indicates the $10 denomination. The words "USA TEN" and a flag can be seen from both sides of the notes when held up to a bright light. The number "10" appears in the star field of the flag. Additionally, this thread glows orange when held under an ultraviolet light.
4. Watermark—A watermark based on the same artwork as the portrait is visible from both sides when held up to a light.
5. Color-Shifting Ink—The number in the lower right corner on the front of the note looks green when viewed straight on, but appears black when viewed at an angle.
6. Serial Numbers—An additional letter is added to the serial number. The unique combination of eleven numbers and letters appears twice on the front of the note.
7. Low-Vision Feature—The large numeral on the back of the $10 note is easy to read. Also, a machine-readable feature has been incorporated for the blind. It will facilitate development of convenient scanning devices that could identify the note as a $10.

8. Fine Line Printing Patterns—The fine lines printed behind both the portrait and the U.S. Treasury Building are difficult to replicate.
9. Microprinting—Because they're so small, microprinted words are hard to replicate. On the front of the note, "TEN" is continually repeated in the numeral in the lower left-hand corner, and "The United States of America" is repeated just above Hamilton's name.

There are means such as light tables, ultraviolet lamps, and illuminated magnifiers to individually or in some cases in combination to examine these features, but none provide an ability in a compact low cost device to examine a sufficient number to be certain of a bills validity.

U.S. Pat. No. 5,444,263, Instrument For The Visual Recognition Of Authenticity Features In Banknotes And Security Documents, invented by Wolfgang R. Mastnak, hereinafter referred to as the Mastnak patent, teaches some of the concepts of the present invention but defines the optics as a cylindrical lens which is incapable of multidirectional magnification of the image. As such the Mastnak invention cannot adequately magnify the microprinting for recognition as it is unidirectional in its magnification. Secondly the method of illumination is also flawed as both the back and front illumination are caused by end illumination the lens and the diffuser. There is no mention of a mirror, prism, or other optical means of direction other than scattered light toward the lens. Likewise, end illumination of the lens has equal if not a more severe flaw in that the fingerlike or cylindrical lens acts as a light pipe and directs the photons toward the lens end distal to the lamp. Only minor scattering of light illuminates the currency in both cases. Mastnak recognizes the flaw in the illumination intensity by tying to enhance the illumination through edge lighting of both the cylindrical lens and diffuser. Again, the efficacy in illuminating the currency in this manner without benefit of directive optics is likewise flawed. Mastnak's substitution of an ultraviolet lamp for the broadband visual spectrum lamp is similarly but more so flawed. Ultraviolet excited fluorescence visibility is very difficult to view in room light without having a shroud to limit the effects of ambient light. It is doubtfil that enough ultraviolet light will reach the phosphors in the thread to adequately fluoresce the thread with this optical arrangement.

The present invention resolves these limitations by providing a device with directed light sources to properly illuminate the currency, an omni-directional lens to magnify the microprinting and fine features for cognitive viewing and other novel features to enhance utility for viewing watermarks and color shifting inks.

SUMMARY OF THE INVENTION

An object of the present invention is to provide a device to omni-directionally magnify the document of interest sufficiently to view the microprinting, and print quality. Another object is to provide a device that can back illuminate the bill for viewing the security thread and watermark and other imbedded features or those having partial aligned images on both the front and rear surfaces. Yet another object is to provide a front illuminating source that can be used to detect and validate the color shifting ink. A further object is to provide ultraviolet illumination to excite the phosphorescence of the security thread. An additional object is to provide a light shield to reduce the amount of room light interference at the lens and improve the brightness and contrast of the image.

The present invention provides a means for positioning a document at a distance from a magnifying lens to create a magnified in focus image while providing a light source within the visible light spectrum to rear illuminate the paper currency. It has a magnifying lens that is useful for enlarging the microprinting located at various locations such as around the face and within the denominational numeral on US paper currency. The microprinting can be seen with either front or rear illumination on the front surface of the currency, while rear illumination is needed to view the polyester thread and the watermark in US currency and alignment features within some non US denominations. The thread has printing which can be seen more easily when magnified, especially the denomination printed in the star field.

Additional features may be added to the basic invention such as an ultraviolet light source in the uvA range to facilitate determination of the fluorescent color of the polyester thread. A lamp emitting at approximately 370 nm is useful for this purpose and is easily filtered to prevent eye damage. UvB and uvc will accomplish fluorescence but are also more harmful and not suggested for this application. In US currency, the thread in the 5-dollar bill glows blue, in the 10-dollar bill it glows orange, in the 20-dollar bill it glows green, in the 50-dollar bill it glows yellow, while in the 100-dollar bill it glows red. Said ultraviolet lamp may be placed in front of or to the rear of the currency. It might additionally be useful to add an ultraviolet filter between the lens and the ultraviolet source to shield the user from ultraviolet light. Furthermore, a diffuser may be advantageously placed between the light source and the currency to make the illumination more uniform.

In a further embodiment of the present invention, a mirror is placed between the lens and the currency at an angle below the lower edge of the currency or above the upper edge of the currency. Said mirror is useful for reflecting light onto the front face of the currency to view the color changing ink. Said color changing ink appears black when rear illuminated and a reflective green when front illuminated. A further embodiment replaces the mirror with a second light source to illuminate the front surface of the currency.

When viewing the watermark it may be useful to move the magnifying lens out of the way to view the watermark unmagnified.

Other objects of the present invention will become apparent to those skilled in the art in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF ILLUSTRATED EMBODIMENTS AND THE BEST MODE

Figure 1A:
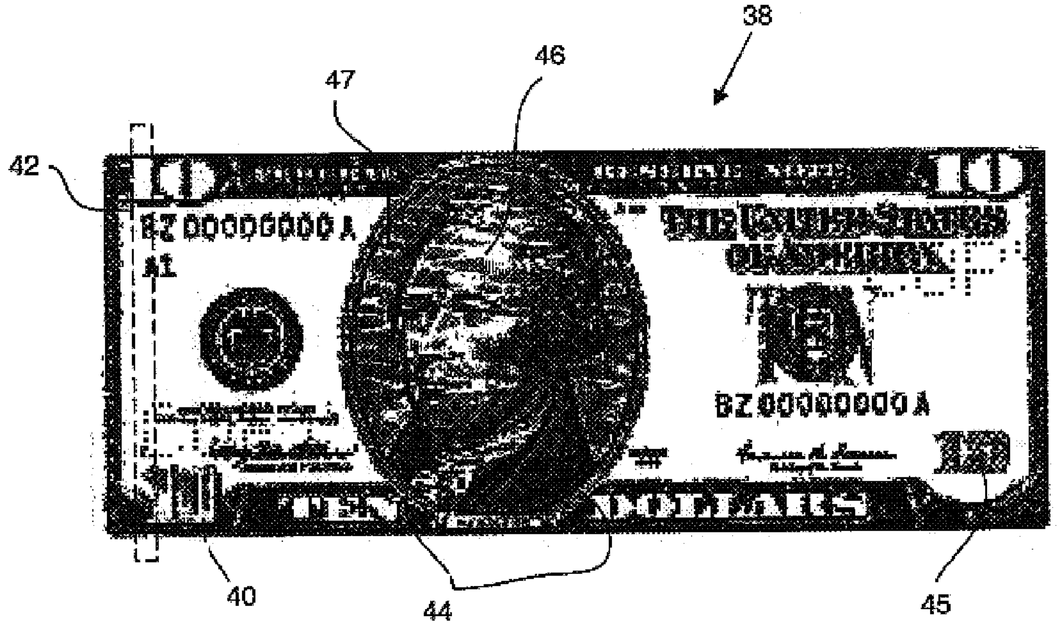
FIG. 1*a* shows the location of security features of interest on the obverse side of a US $10 bill.
Figure 1B:
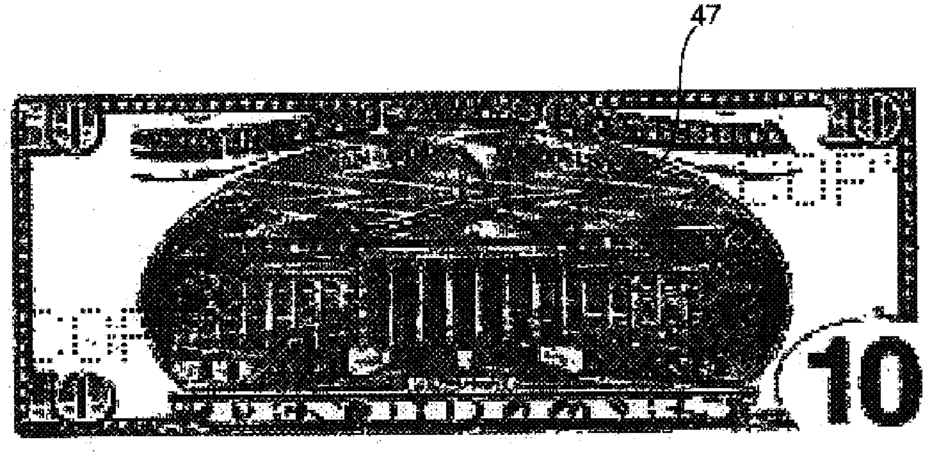
FIG. 1*b* shows the location of security features of interest on the reverse side of a US $10 bill.

The illustrated FIGS. 1 through 8 are herein referenced to depict the various features of the present invention. FIGS. 1*a* and 1*b* depicts a facsimile of the US $10 bill 38 as a reference to the zones of interest for validating the authenticity of a US $10 dollar bill. It will be recognized by those skilled in the art that other currency denominations of the United States as well as currency with security features of other nations can be validated in the same manner. It will also be recognized that other documents such as personal and corporate checks are presently utilizing microprinting, watermarks, and other security measures that the present invention will be useful to detect and view.

Item 40 has microprinting within the border of the numeral 10 and 44 microprinting around the lower rim of the portrait 46. Said microprinting is approximately 0.2 millimeters or 0.008 inches high. It will be recognized by those skilled in the art that magnification of this feature is essential for recognition. Fine line work 47 is located behind the portrait 46 on the obverse and behind the treasury building on the reverse. Item 42 is the representative area wherein an embedded printed thread is located. The location may vary on the different denominations. Item 45 is the numeral denomination printed in color changing ink.

Figure 2:
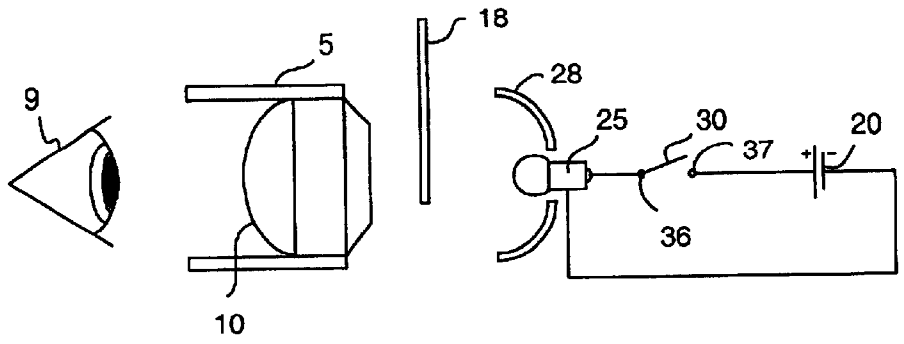
FIG. 2 shows an optical diagram of basic invention.

FIG. 2 shows a diagram of the basic implementation of the present invention. The eye 9 represents the viewer looking at the magnified image. The lens 10 being a magnifying lens or lens system with a magnification greater than or equal to 2, positioned so that the surface of the document 18 is positioned to create an in focus image. A magnification of 10× is preferred. The room-light minimizing shroud 5 surrounds the lens to provide a measure of isolation from the ambient light. The remainder of the present invention includes a light source 25 with a luminous output in the visible light spectrum, a reflector 28 for focusing the light source on the back of the document 18, a power source 20 herein shown as a battery, and a switch 30. One terminal of said power source 20 is connected to a first terminal of said light source 25 while the second terminal of said power source 20 is connected to a first terminal 36 of said switch 30. The second terminal 37 of said switch is connected to the second terminal of said light source 25. It will be recognized by those skilled in the art that the light source 25 is not limited to incandescent lamps but might be an led of various spectral emissions, a florescent lamp, an electroluminescent lamp, an Ultraviolet gas discharge lamp, or an Ultraviolet led. Other types of lighting are by definition not eliminated. It will also be recognized by those skilled in the art that various power sources are possible including batteries, electronically controlled power sources and alternating current, AC.

Figure 3:
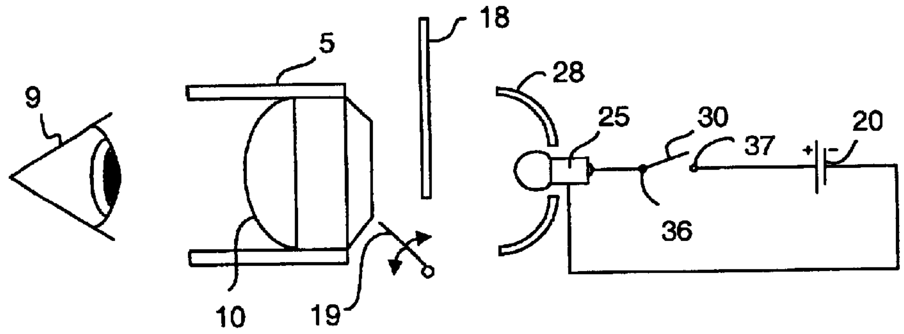
FIG. 3 shows an additional optical diagram showing a front illumination mirror.

FIG. 3 shows a diagram of another implementation of the present invention. The eye 9 represents the viewer looking at the magnified image. The lens 10 being a magnifying lens or lens system with a magnification greater than or equal to 2, positioned so that the surface of the document 18 is positioned to create an in focus image. A magnification of 10× is preferred. The room-light minimizing shroud 5 surrounds the lens to provide a measure of isolation from the ambient light and has a moveable mirror reflector 19 located between said document 18 and said lens 10. Said moveable mirror reflector 19 providing a means for reflecting a portion of said light provided by said light source upon the obverse surface of said document 18. Said moveable mirror reflector 19 may be positioned to reflect light upon the color shifting ink or to shut off transmission of light to the obverse surface. The remainder of the present invention includes a light source 25 with a luminous output in the visible light spectrum, a reflector 28 for focusing the light source on the back of the document 18, a power source 20 herein shown as a battery, and a switch 30. One terminal of said power source 20 is connected to a first terminal of said light source 25 while the second terminal of said power source 20 is connected to a first terminal 36 of said switch 30. The second terminal 37 of said switch is connected to the second terminal of said light source 25.

Figure 4:
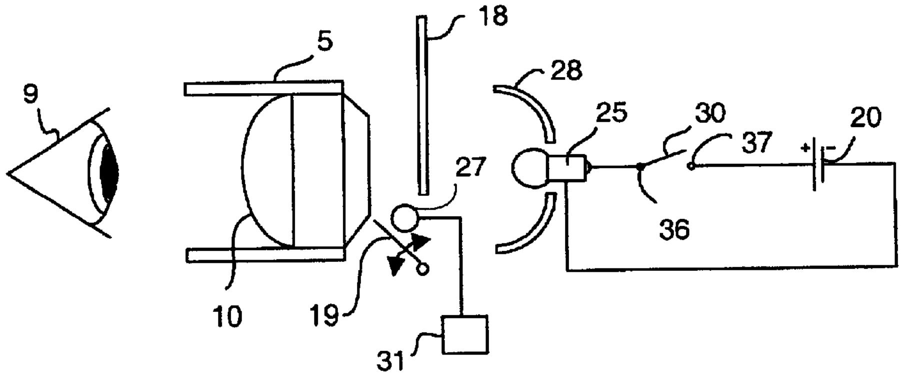
FIG. 4 shows an additional optical diagram showing an ultraviolet front light source.

FIG. 4 shows a diagram of a further implementation of the present invention. The eye 9 represents the viewer looking at the magnified image. The lens 10 being a magnifying lens or lens system with a magnification greater than or equal to 2, positioned so that the surface of the document 18 is positioned to create an in focus image. A magnification of 10× is preferred. The room-light minimizing shroud 5 surrounds the lens to provide a measure of isolation from the ambient light and has a second light source 27 located between said document 18 and said lens 10. Said second light source 27 providing a means for illuminating said obverse surface of said document 18. Said second light source 27 is positioned to illuminate the color shifting ink or may be shut off to allow only back lighting from light source 23. Second light source 27 may be a visible or ultraviolet source. In fact both types of light source may be available in the same embodiment. Additionally a mirror reflector may be positioned as in FIG. 3 behind said second light source 27 being attached to said moveable mirror reflector 19 and serves to reflect the visible light of light source 25 when said second light source 27 is Ultraviolet and is off or the ultraviolet source when the visible light source 25 is off. Said moveable mirror reflector 19 may be positioned to reflect light upon the color shifting ink or to shut of transmission of light to the obverse surface. The remainder of the present invention includes a light source 25 with a luminous output in the visible light spectrum, a reflector 28 for focusing the light source on the back of the document 18, a power source 20 herein shown as a battery, and a switch 30. One terminal of said power source 20 is connected to a first terminal of said light source 25 while the second terminal of said power source 20 is connected to a first terminal 36 of said switch 30. The second terminal 37 of said switch is connected to the second terminal of said light source 25.

Figure 5:
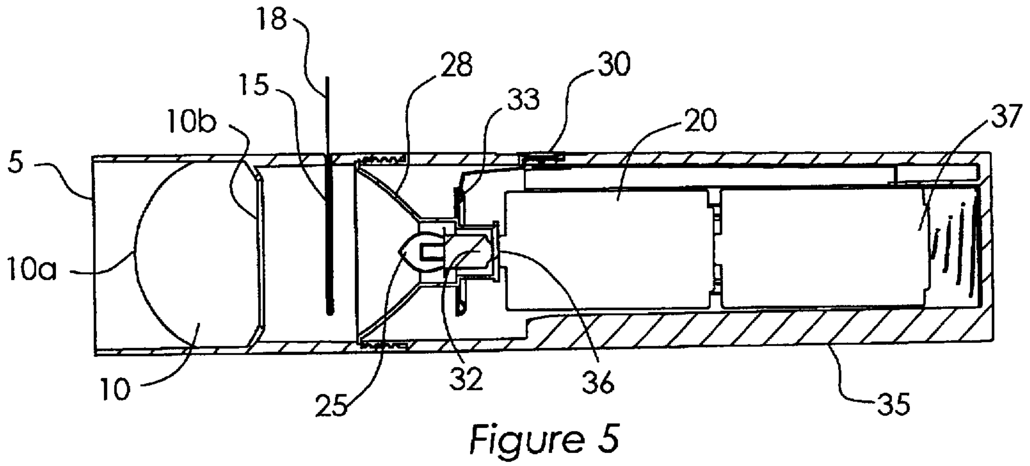
FIG. 5 shows a cross-sectional view of one embodiment of the invention.

FIG. 5 presents the preferred embodiment of the present invention. It includes an omni-directional magnifying lens or lens system 10. Said lens system may be as simple as a single element lens having a spherical like first surface 10*a* and a flat second surface 10*b*, a single or multi-element aspheric lens set, or a zoom lens having a minimum magnification of 2. A magnification of 10× is preferred. A room-light minimizing shroud 5 surrounds said lens 10. Said shroud 5 having a document positioning slit 15 for positioning document 18 in focus with said lens 10. On the distal side of said document positioning slit 15 is a lamp reflector 28, housing a light source 25 located in a power source and lamp assembly housing 35. Said power source and lamp assembly housing 35 further containing a set of contacts for connecting a first terminal 36 of said power source 20 to a first terminal 32 of said light source 25 while the second terminal 37 of said power source 20 is connected to a first terminal of said switch 30. The second terminal of said switch 30 is connected to the second terminal 33 of said light source 25. Said power source and lamp assembly housing 35 being fixably connected to said shroud 5.

Figure 6:
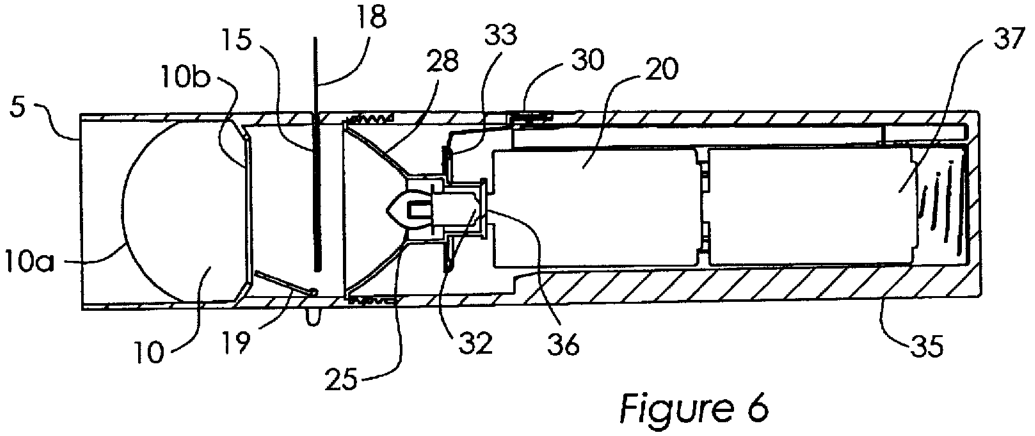
FIG. 6 shows a cross-sectional view of another embodiment of the invention with reflective mirror.

FIG. 6 presents a second embodiment of the present invention. It includes an omni-directional magnifying lens or lens system 10. Said lens system may be as simple as a single element lens having a spherical like first surface 10*a* and a flat second surface 10*b*, a single or multi-element aspheric lens set, or a zoom lens having a minimum magnification of 2. A magnification of 10× is preferred. A room-light minimizing shroud 5 surrounds said lens 10. Said shroud 5 having a document positioning slit 15 for positioning document 18 in focus with said lens 10 and a moveable mirror reflector 19. On the distal side of said document positioning slit 15 is a lamp reflector 28, housing a light source 25 located in a power source and lamp assembly housing 35. Said power source and lamp assembly housing 35 further containing a set of contacts for connecting a first terminal 36 of said power source 20 to a first terminal 32 of said light source 25 while the second terminal 37 of said power source 20 is connected to a first terminal of said switch 30. The second terminal of said switch 30 is connected to the second terminal 33 of said light source 25. Said power source and lamp assembly housing 35 being fixably connected to said shroud 5.

Figure 7:
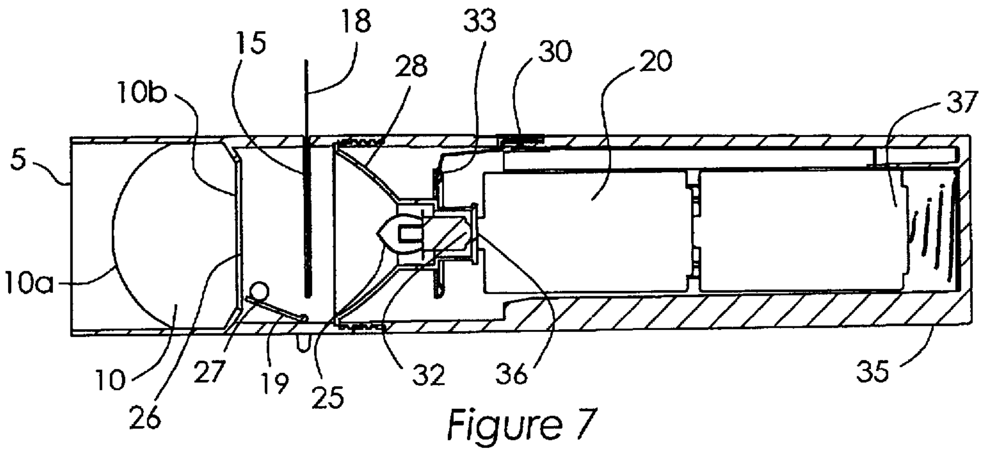
FIG. 7 shows a cross-sectional view of a further embodiment of the invention with additional light sources.

FIG. 7 presents an additional embodiment of the present invention. It includes an omni-directional magnifying lens or lens system 10. Said lens system may be as simple as a single element lens having a spherical like first surface 10*a* and a flat second surface 10*b*, a single or multi-element aspheric lens set, or a zoom lens having a minimum magnification of 2. A magnification of 10× is preferred. A room-light minimizing shroud 5 surrounds said lens 10. Said shroud 5 having a document positioning slit 15 for positioning document 18 in focus with said lens 10 and a moveable mirror reflector 19 mountably containing a front light source 27. Said front light source 27 may be an Ultra violet gas discharge lamp powered by an inverter circuit or the like or by a DC power source if said ultraviolet light source is a UV-led. On the distal side of said document positioning slit 15 is a lamp reflector 28, housing a light source 25 located in a power source and lamp assembly housing 35. Said power source and lamp assembly housing 35 further containing a set of contacts for connecting a first terminal 36 of said power source 20 to a first terminal 32 of said light source 25 while the second terminal 37 of said power source 20 is connected to a first terminal of said switch 30. The second terminal of said switch is connected to the second terminal 33 of said light source 25. Said power source and lamp assembly housing 35 being fixably connected to said shroud 5.

Figure 8:
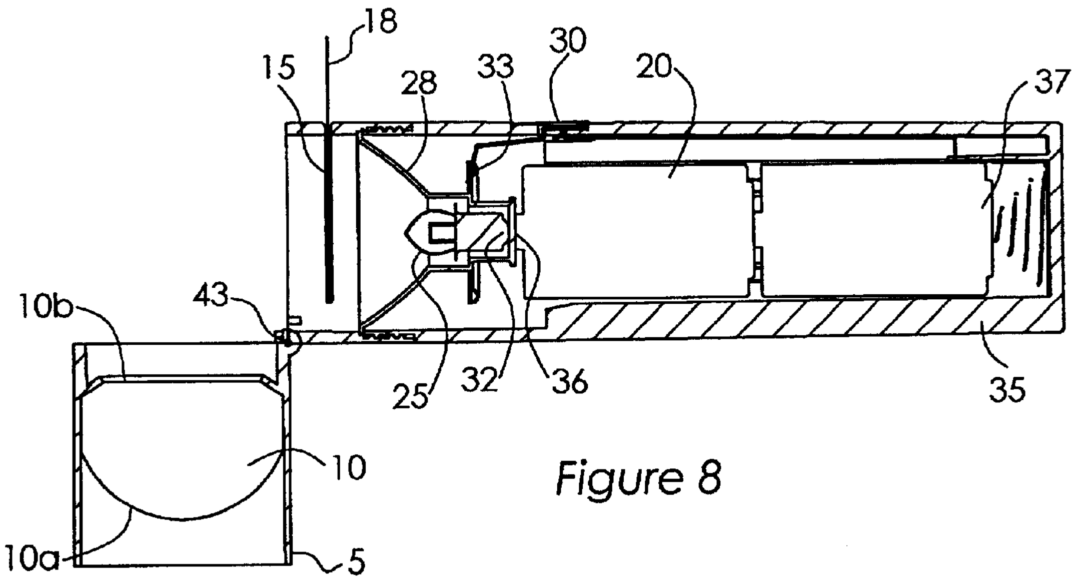
FIG. 8 shows a cross-sectional view of one embodiment of the invention with a breakaway lens.

FIG. 8 presents a further embodiment of the present invention. It includes an omni-directional magnifying lens or lens system 10. Said lens system may be as simple as a single element lens having a spherical like first surface 10*a* and a flat second surface 10*b*, a single or multi-element aspheric lens set, or a zoom lens having a minimum magnification of 2. A magnification of 10× is preferred. A room-light minimizing shroud 5 surrounds said lens 10. Said shroud 5 having a document positioning slit 15 for positioning document 18 in focus with said lens 10. Said shroud 5 further having a hingeable joint for swinging said omni-directional magnifying lens or lens system 10 out of the way so that said document 18 is viewable without magnification when back illuminated by said light source 25. Said configuration is useful for illuminating such features as watermarks and front and back split features without benefit of magnification. On the distal side of said document positioning slit 15 is a lamp reflector 28, housing a light source 25 located in a power source and lamp assembly housing 35. Said power source and lamp assembly housing 35 further containing a set of contacts for connecting a first terminal 36 of said power source 20 to a first terminal 32 of said light source 25 while the second terminal 37 of said power source 20 is connected to a first terminal of said switch 30. The second terminal of said switch is connected to the second terminal 33 of said light source 25. Said power source and lamp assembly housing 35 being fixably connected to said shroud 5. Those skilled in the art will appreciate that various features of FIGS. 6 and 7 can be combined with FIG. 8 to get differing configurations.

As will be obvious to persons skilled in the art, various modifications, adaptations, and variations of the specific disclosure can be made without departing from the teaching of the invention.

Having described the invention, what is claimed as new and desired to be secured by Letters Patent is:

1. A counterfeit detection device for magnifying and observing the detailed security features of a document having at least one security feature wherein;

said counterfeit detection device is comprised of at least an omni-directional magnification lens having at least a first surface, a second surface, and an object plane located proximate the surface of said document having at least one security feature;

said first surface of said omni-directional magnification lens is substantially spherical and said second surface of said omni-directional magnification lens is substantially planar;

said omni-directional magnification lens is mounted to and surrounded by an ambient light blocking shroud;

said document having at least one security feature located within a document locating feature of said counterfeit detection device proximate said object plane;

a light source located distal to said document having at least one security feature wherein said light source illuminates from a rearward side of said document having at least one security feature;

said rearward side illumination being useful for viewing watermarks, microprinting, internal polyester threads with printing and microprinting, internal polyester thread fluorescence, split images and the like; and said light source being connected to a power source causal to illuminate said light source and said rearward side of said document having at least one security feature.

2. The counterfeit detection device of claim 1, wherein a power supply connecting switch is located between said power source and said light source.

3. The counterfeit detection device of claim 1, wherein said light source is chosen from at least one of the group consisting of a broad spectrum visible light source, a narrow wavelength visible light source and an ultraviolet light source.

4. The counterfeit detection device of claim 3, wherein a reflective mirror is located between the document having at least one security feature and said omni-directional magnification lens;

said reflective mirror being disposed to reflect light on to a front surface of said document having at least one security feature to illuminate front surface specific security features; and illumination of said front surface being useful for viewing microprinting, polyester thread fluorescence, and color changing inks.

5. The counterfeit detection device of claim 4, wherein said reflective mirror is moveable for directing said light to specific areas of said front surface of said document having at least one security feature; and said reflective mirror movement additionally being able to block the path of said light toward said front surface of said document having at least one security feature.

6. The counterfeit detection device of claim 5, wherein said reflective mirror additionally has a front illuminating light source affixed thereon;

said reflective mirror sewing to direct light from said front illuminating light source toward the front surface of said document having at least one security feature; and said front illuminating light source being chosen from the group consisting of a broad spectrum visible light source, a narrow wavelength visible light source and an ultraviolet light source.

7. The counterfeit detection device of claim 1, wherein said omni-directional magnifying lens has an ultraviolet filter proximate said second surface.

8. The counterfeit detection device of claim 1, wherein said omni-directional magnifying lens is a zoom lens for magnifying said document having at least one security feature with a variable magnification.

9. A counterfeit detection device for magnifying and observing the detailed security features of a document having at least one security feature wherein;

said counterfeit detection device is comprised of at least an omni-directional magnification lens having at least a first surface, a second surface, and an object plane located proximate the surface of said document having at least one security feature;

said omni-directional lens being mounted in a lens shroud useful for blocking ambient light;

said lens shroud further having a document locating feature proximate said object plane;

said lens shroud additionally having a pivotal feature to allow said omni-directional lens and shroud to be pivoted away from said document having at least one security feature;

said pivotal feature being useful for viewing features such as watermarks and the like unmagnified within said document having at least one security feature;

a light source located distal to said document having at least one security feature wherein said light source illuminates from a rearward side of said document having at least one security feature;

said rearward side illumination being useful for viewing watermarks, microprinting, internal polyester threads with printing and microprinting, internal polyester thread fluorescence and split images; and said light source is connected to a power source causal to illuminate said light source and said reward side of said document having at least one security feature.

10. The counterfeit detection device of claim 9, wherein said omnidirectional magnification lens has a first surface which is largely spherical and a second surface which is largely planar.

11. The counterfeit detection device of claim 9, wherein a power supply connecting switch is located between said power source and said light source.

12. The counterfeit detection device of claim 9, wherein said light source is chosen from at least one of the group consisting of a broad spectrum visible light source, a narrow wavelength visible light source and an ultraviolet light source.

13. The counterfeit detection device of claim 12, wherein a reflective mirror is located between the document having at least one security feature and said omni-directional magnification lens;

said reflective mirror being disposed to reflect light on to a front surface of said document having at least one security feature to illuminate front surface specific security features; and illumination of said front surface being useful for viewing microprinting, polyester thread fluorescence, and color changing inks.

14. The counterfeit detection device of claim 13, wherein said reflective mirror is moveable for directing said light to specific areas of said front surface of said document having at least one security feature; and said reflective mirror movement additionally being able to block the path of said light toward said front surface of said document having at least one security feature.

15. The counterfeit detection device of claim 14, wherein said reflective mirror additionally has a front illuminating light source affixed thereon;

said reflective mirror serving to direct light from said front illuminating light source toward the front surface of said document having at least one security feature; and said front illuminating light source being chosen from the group consisting of a broad spectrum visible light source, a narrow wavelength visible light source and an ultraviolet light source.

16. The counterfeit detection device of claim 9, wherein said omni-directional magnifying lens has an ultraviolet filter proximate said second surface.

17. The counterfeit detection device of claim 9, wherein said omni-directional magnifying lens is a zoom lens for magnifying said document having at least one security feature with a variable magnification.

* * * * *